United States Patent [19]
Hoerger

[11] Patent Number: 6,057,994
[45] Date of Patent: May 2, 2000

[54] SINGLE REEL TAPE CARTRIDGE WITH BRAKING AND PROTECTION MECHANISM

[75] Inventor: Carl R. Hoerger, Boise, Id.

[73] Assignee: Hewlett-Packard Company, Palo Alto, Calif.

[21] Appl. No.: 09/121,764

[22] Filed: Jul. 23, 1998

[51] Int. Cl.[7] .............................. G11B 15/22; G11B 23/02
[52] U.S. Cl. ..................... 360/132; 360/74.1; 360/96.5; 242/338.1
[58] Field of Search .................... 360/96.5, 132, 360/74.1; 242/326.1, 338, 338.1, 338.3, 343, 343.1, 343.2

[56] References Cited

U.S. PATENT DOCUMENTS

| | | | |
|---|---|---|---|
| 4,094,478 | 6/1978 | Shroff et al. | 242/334.3 |
| 4,405,096 | 9/1983 | Possl | 242/343 |
| 5,057,961 | 10/1991 | Rayis | 360/137 |
| 5,833,157 | 11/1998 | Yoo | 242/336.4 |
| 5,859,755 | 1/1999 | Griffin et al. | 360/128 |
| 5,917,673 | 6/1999 | Sawai | 360/85 |
| 5,927,631 | 7/1999 | Yoo | 242/334.6 |

*Primary Examiner*—Jefferson Evans

[57] ABSTRACT

A tape cartridge for use with an operatively compatible tape drive having a tape reeling mechanism, the cartridge including a housing having an opening therein, a tape-supply reel within the housing, with magnetic tape wound on the reel and having a free end proximate the housing opening, and a tape reel braking and protection mechanism which includes a band substantially surrounding a marginal edge of the tape reel; and the band being anchored with respect to the reel at a fulcrum point for the band to allow variation of an effective radius of the band and configured to interact with a radius controller mechanism for varying the effective radius of the band.

18 Claims, 5 Drawing Sheets

SINGLE REEL TAPE CARTRIDGE WITH BRAKING AND PROTECTION MECHANISM

FIELD OF THE INVENTION

This invention relates to magnetic tape drives in general, and in particular to single reel recording tape cartridges.

BACKGROUND OF THE INVENTION

A widely used medium for storing data is recording tape, which is typically a polymer tape with a magnetic coating. One of the most popular formats of use for the storage of data on tape is tape cartridges. Tape cartridges are generally smaller, simpler and less expensive than reel-to-reel tape systems.

Two widely used formats of tape cartridges are the two-reel cartridge, which is typically in a quarter-inch tape format, and the single, supply-reel cartridge, generally a half-inch tape format cartridge. By enclosing the tape within a housing or cartridge, the tape, and therefore the data stored on the tape, are better protected from damage than the more exposed reel-to-reel systems of tape data storage.

The single, supply-reel or half-inch cartridge is able to store much more data than the quarter inch cartridge. Typically, the free end of the tape in the cartridge is attached to a leader block. The leader block is fashioned to act as a barrier or door when the cartridge is not in use, and thereby greatly reduce exposure of the cartridge to potential sources of harm such as dust, particulate matter contamination and other forms of environmental stress or damage. When the cartridge is in use, the leader block's function is to provide a structure to allow the tape to be withdrawn from the cartridge, into the tape drive for data recording or retrieval. The take-up reel or spool is built into the tape drive along with an automatic tape threading mechanism. The automatic tape threading mechanism includes a means for capturing the leader block, typically the capture is by a tape threading pin, and then the mechanism appropriately threads the leader block and tape in the tape drive.

The recording of data onto the tape is generally referred to as "writing" to the tape and the retrieval of information already written or stored on the tape is referred to as "reading" from the tape. The part of the tape system responsible for these activities is generally referred to as the read/write head. The tape drive that performs the read/write operations is also referred to as a tape "transport."

Typically, the standard tape transport or drive accepts the tape cartridge into an elevator assembly. A threading mechanism grabs the leader block and pulls it free from the cartridge. The leader block is then used to thread the tape through a path which includes a series of guide posts, across the longitudinal read/write head, and into a slot in the take-up reel. Once threaded, the tape from the cartridge can be driven across the read/write head(s) for data transfer operations and wound onto the take-up reel.

The take-up reel is typically configured to allow the positioning of the leader block into the hub of the take-up reel in a manner that, ideally, allows the tape to wind smoothly onto the take-up reel. The leader block is captured by a threading pin attached to a threading or threader arm assembly. The threading arm then pulls the leader block in a counter-clockwise direction through the tape path and inserts the leader block into the hub of the take-up reel.

During winding on of the tape onto the take-up reel, the leader block spins around the threading pin, as the pin and the take-up reel have the same axis of rotation in this configuration. When the leader block is fully inserted into the take-up reel, the leader block forms a part of the outer circumference of the take-up reel and thus, the magnetic tape winding surface. The leader block and take-up reel are fabricated with a degree of precision so that when the leader block is inserted into the slot in the take-up reel, the slot is closed by the end of the leader block so that a relatively smooth surface is created on the hub of the take-up reel for winding the tape on the hub.

Ideally, the tape cartridge, or housing and all of the components are designed and manufactured to promote the best possible storage and retrieval of data on the tape. One important goal in the design and manufacture of the components is to have the tape wind smoothly through the drive and onto and off of both the supply reel and the take-up reel. Another important goal in the design and manufacture of the tape cartridge is to protect the tape cartridge and data stored on the tape from physical damage, such as environmental contamination. Examples of sources of contamination include smoke, dust, fingerprints, and other particulate matter. Unfortunately, there are numerous potential hazards in the structures and functions of the single reel tape system that make obtainment of consistently smooth tape winding problematical. Any misalignment of the magnetic tape within the system can result in a non-uniform tape winding surface which causes undesirable irregularities in the magnetic tape as it is wound or unwound from either reel. Such misalignments can garble data and operations, causing errors in either or both the writing of data to the tape and reading of data from the tape.

Improvements in the functioning of the tape storage and retrieval system are constantly sought to decrease sources of error and failure in data storage and retrieval. Whenever data is transmitted and wherever it is stored, it is vulnerable to many different forces and conditions that can physically distort the record, changing the character of the data. Any source of error is problematical to the accurate and successful recording and retrieval of data to and from the tape. Irretrievable data can be catastrophic at worst and is always undesirable. The consequences can be devastating; for example, as little as a single wrong data bit can change the meaning of an entire sequence of bits, perhaps throwing off a complex mathematical calculation or causing a computer to misinterpret a command. The sources of risk for error and failure are under constant scrutiny for reduction and elimination in the industry. A combination of strategies may be best to safeguard the data from the inevitable assault of errors.

A place in the system where problems can occur or develop is the supply reel, in the tape cartridge. When the cartridge is not in use in a tape drive, it is possible in some cartridges for the tape to lose tension and become partially unwound from the reel. When the tape is loose and unwound, it is possible for the tape to loop back on itself. The tape can be damaged as a result of the loose wraps and misalignments, for example, the recording side of the tape coming in contact with itself and causing damage. Loose or misaligned tape on the reel can also be damaged by sharp creases being put in the tape, if the looped-back sections inadvertently become trapped and rewound tightly and under tension on the supply reel or through snapping and possibly breaking the tape when tension is restored to the tape in the cartridge. The tape in the cartridge can also be damage by contamination and/or particulate matter, as well as loose or unwound tape in combination with environmental contamination. To prevent problems and failures caused by this nature of problem, one solution has been to add additional structures to the cartridge. For example, spring-biased catches, that grab either an added brake structure, or the drive gears that are integrated on the reel, for engagement with the torque motor when in the tape drive, have been utilized. Such structures do help to reduce the likelihood of the tape coming loose off the supply reel, but the additional structures also come with their own characteristic disadvantages. Every added structure adds undesirably to the cost and complexity of the system. Added structures also represent their own potential basis of system failures, in the form of malfunctioning or broken parts and components.

There is still a demand and need for methods and apparatus to reduce the possible sources of error in tape recording systems.

SUMMARY OF THE INVENTION

The invention comprises, in general terms, a tape cartridge for use with an operatively compatible tape drive having a tape reeling mechanism, the cartridge comprising a housing having with an opening therein, a tape-supply reel within the housing, magnetic tape wound on the reel and having a free end proximate the housing opening, a tape reel braking and protection mechanism which comprises a band substantially surrounding a marginal edge of the tape reel; and the band being anchored with respect to the reel at a fulcrum point for the band to allow variation of an effective radius of the band and configured to interact with a radius controller mechanism for varying the effective radius of the band.

Additional advantages and novel features of the invention will be set forth in part in the description that follows, and in part will become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF THE INVENTION

Referring to FIGS. 1–5, exemplary embodiments of the present invention are described herein. The tape cartridge of the present invention generally includes at least a housing 20, a tape supply reel 30, with magnetic tape 40 and tape reel braking and protection mechanism or band 50.

Housing 20 of cartridge 10 is generally rectangular in shape and generally a box-like structure, adapted to enclose a single reel of tape. Housing 20 includes a top section 22, which is parallel to a bottom section 24, with top 22 and bottom 24 being joined by a plurality of sidewalls 26. Sidewalls 26 are perpendicular to top 22 and bottom 24. Housing 20 may be composed of any appropriate material, such that the outside of housing 20 will not change shape when band 50 changes shape. Housing 20 may be opaque or transparent. Housing 20 further includes an access window 28. Access window 28 may be located in any appropriate location along a sidewall 26 of housing 20. For example, window 28 may be located in approximately the center of a sidewall 26 or near a corner, where two sidewalls 26 meet. The location of window 28 only needs to be compatible with any particular tape drive unit that cartridge 10 is intended to be used with. Although housing 20 is generally rectangular in shape, a shortened, angled additional sidewall is optionally included, as the location of access window 28. In the case where the additional shortened side wall is added, housing 20 is still substantially rectangular with the fifth side appearing as a notched or flattened corner, on one of the corners of the rectangle. Access window 28 permits the entry and exit of a leader block through window 28.

Tape supply reel 30 has a top flange 32, bottom flange 34, and tape-winding hub 36. Hub 36 has a radial, tape-winding surface, and a top 36T, and bottom 36B. Top flange 32 is substantially disk-shaped and has a top surface 32T, a bottom surface 32B and an outside marginal or circumferential edge 32E. Top flange 32 is attached to hub 36 concentrically, with bottom surface 32B of top flange 32 being attached to top surface 36T of hub 36. Bottom flange 34 is of like dimension as top flange 32. Bottom flange 34 has a top surface 34T, bottom surface 34B and outside marginal or circumferential edge 34E. Bottom flange 34 is also attached to hub 36 in an analogous relationship to that of top flange 32, with the distinction that top surface 34T of bottom flange 34 is attached to bottom surface 36B of hub 36.

A length or web of magnetic tape 40 is wound on to hub 36 of supply reel 30. Typically, tape 40 is wound on to reel 30 in a counterclockwise direction. A fixed end (not shown) of tape 40 is attached by any appropriate means to hub 36. Tape 40 is disposed in wraps around hub 36, as is well known to one skilled in the art.

Figure 2A:
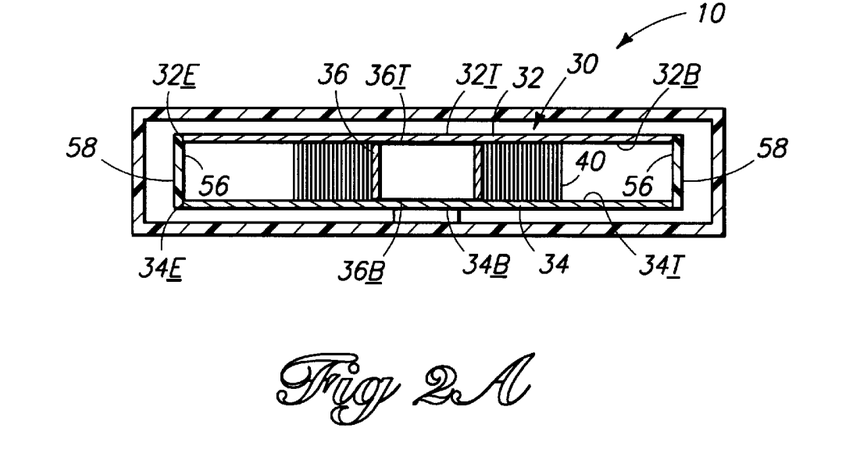
FIG. 2A is a full section taken along line 2A—2A in FIG. 1.
Figure 2B:
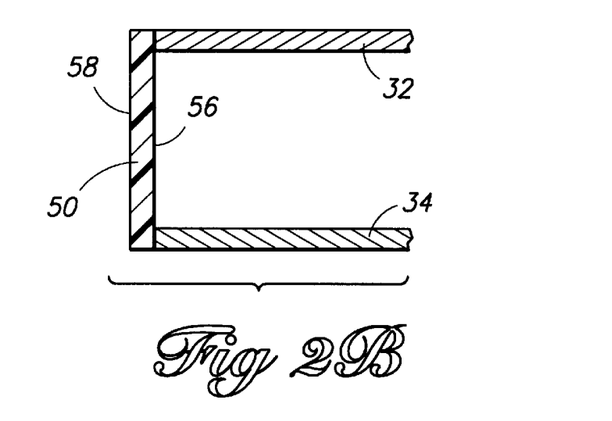
FIG. 2B is a partial section of the periphery of the tape reel in contact with the mechanism of the invention.
Figure 2C:
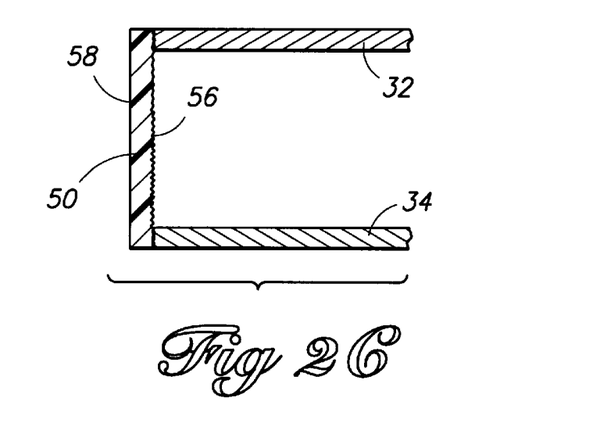
FIG. 2C is a partial section of another embodiment showing the periphery of the tape reel in contact with the mechanism of the invention.
Figure 3A:
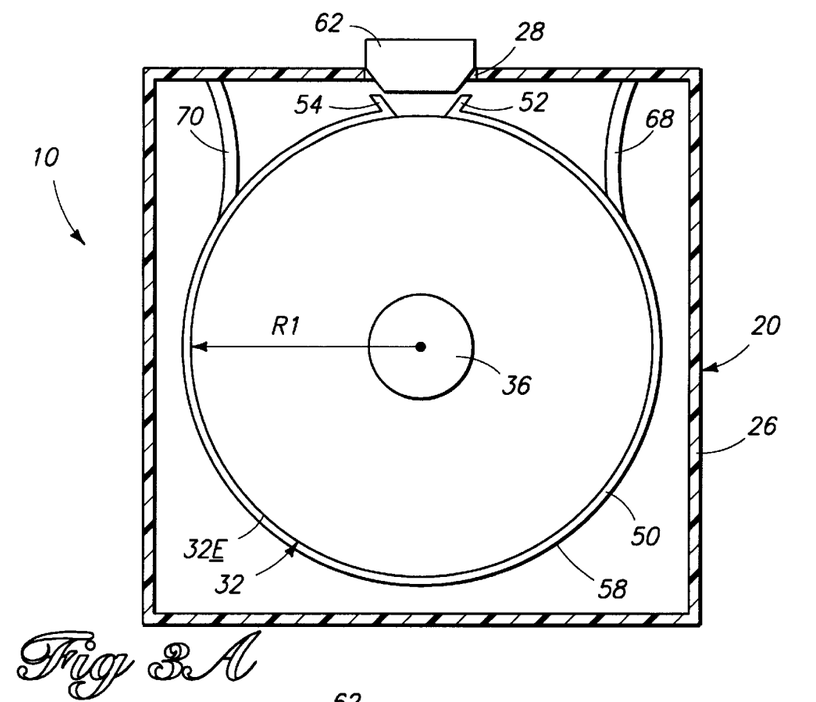
FIG. 3A is a schematic plan view with the band of the inventive mechanism in contact with the tape reel.
Figure 3B:
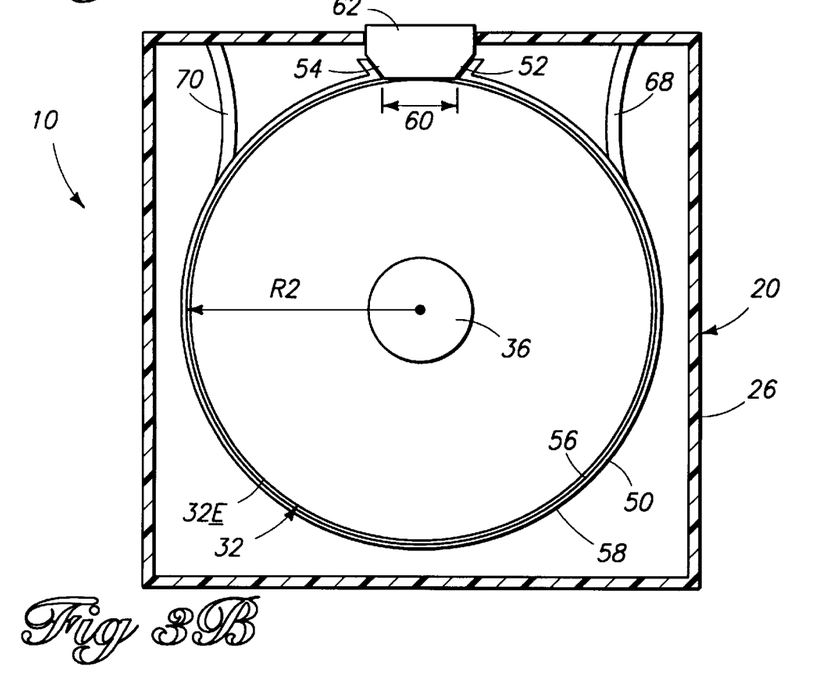
FIG. 3B is a schematic plan view with the band of the inventive mechanism not in contact with the tape reel.
Figure 4A:
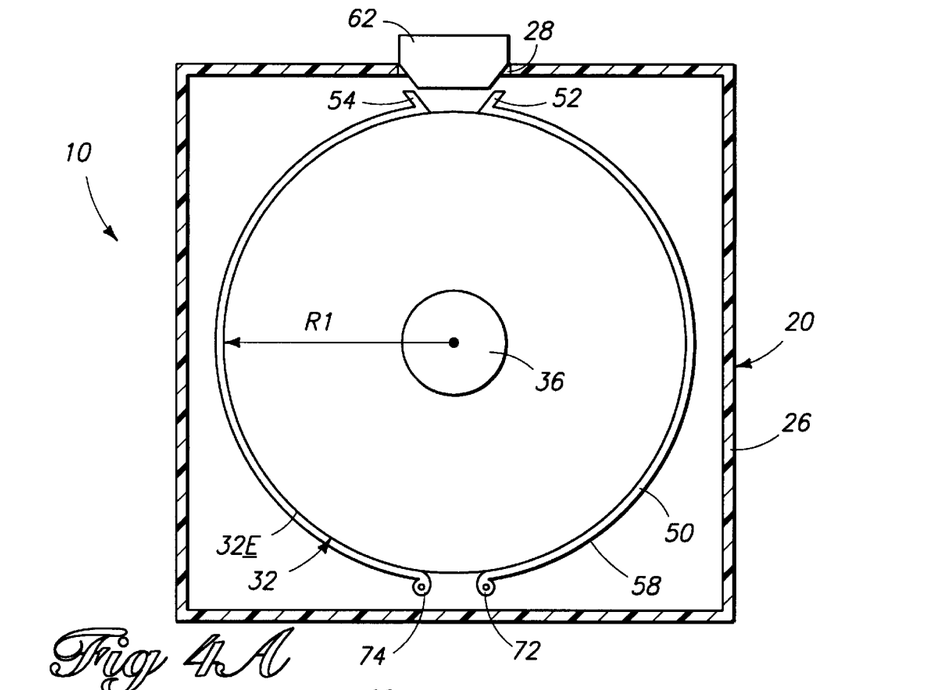
FIG. 4A is a schematic plan view of an alternate embodiment of the invention.
Figure 4B:
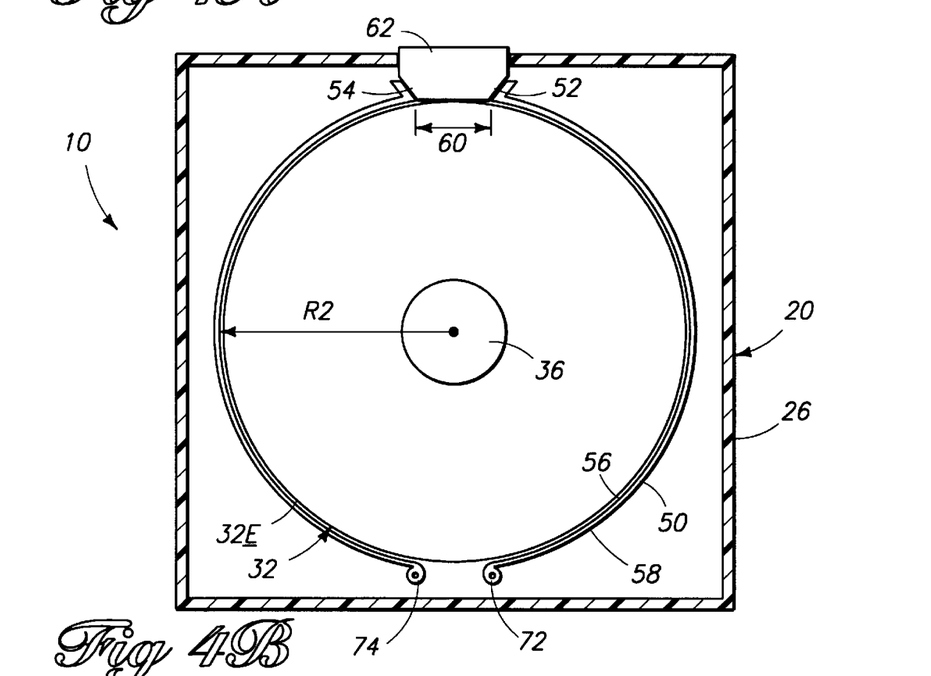
FIG. 4B is a schematic plan view of an alternate embodiment of the invention.
Figure 5:
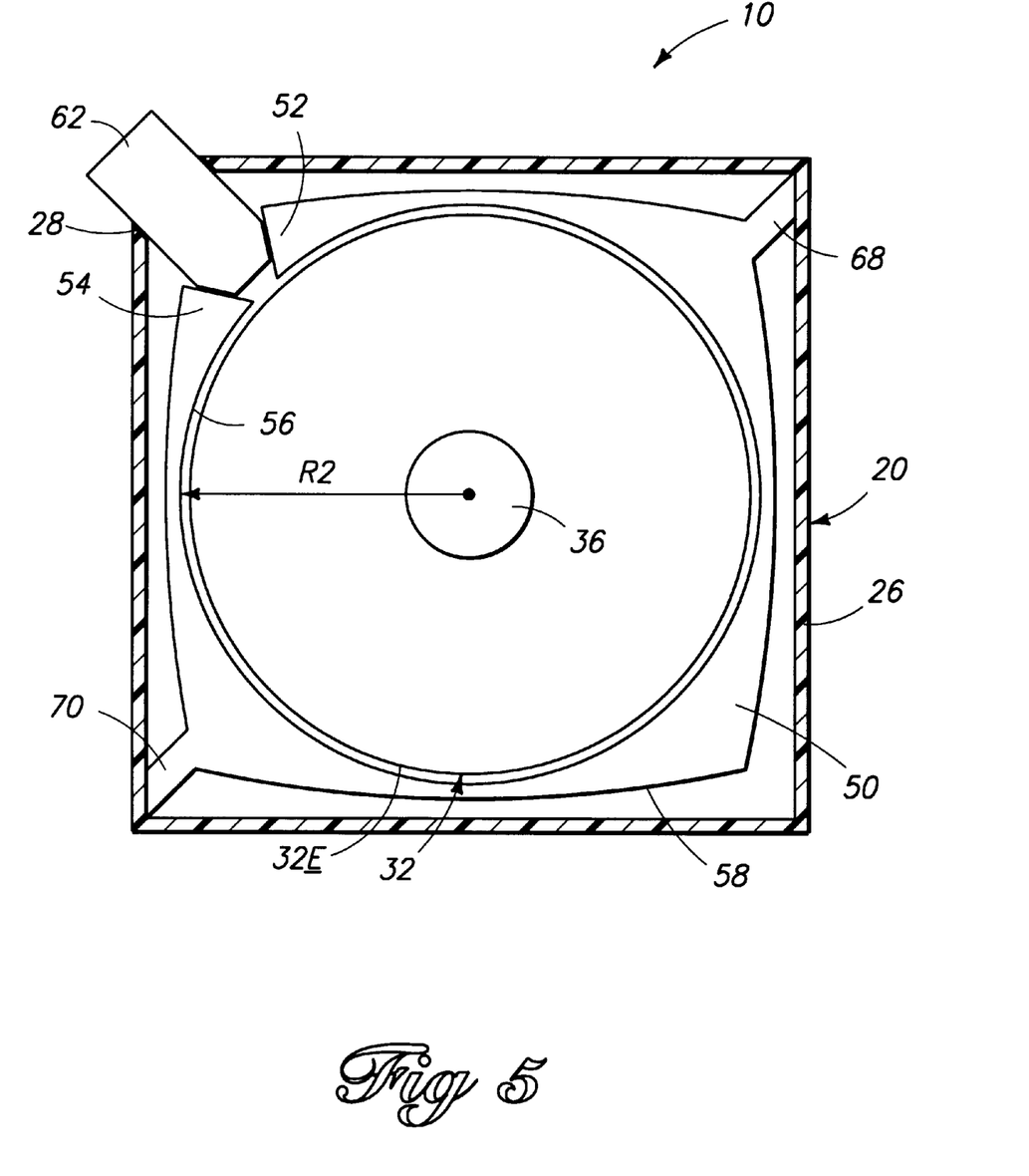
FIG. 5 is a schematic plan view of an alternate embodiment of the invention.

Band 50 is located between tape supply reel 30 and the inside of housing 20. Band 50 comprises a first end 52, a second end 54, inner surface 56 and outer surface 58. An opening 60 may be created between, and defined by the space between first end 52 and second end 54. Band 50 is further comprised of at least one fulcrum point. Band 50 is configured to interact with a radius controller mechanism 62. Outer surface 58 of band 50 is oriented to face the inside of the sidewalls 26 of housing 20. Inner surface 56 of band 50 is oriented with inner surface 56 facing reel 30, rather than a sidewall 26 of housing 20. Inner surface 56 is configured and dimensioned to be in contact with both marginal edge 32E of top flange 32 and marginal edge 34E of bottom flange 34, when band 50 is in an inactive or braking position, as shown in FIGS. 2a and 2b. Outer surface 58 of band 50 may be circular in shape and symmetrical with the shape of reel 30 and inside surface 56, as shown in FIGS. 3 and 4 or outer surface 58 may have a different shape, for example outer surface 58 might approximately conform to the shape of the inside of housing 20, as shown in FIG. 5.

Band 50 functions to protect recording tape 40. Band 50 also functions as a braking mechanism and immobilizes reel 30 in a stationary position, thereby inhibiting tape 40 from unwinding or becoming loosely wound on reel 30. An important feature of cartridge 10 is that contact caused by band 50 is purposefully made with both top flange 32 and bottom flange 34 of reel 30 when band 50 is in it's inactive or protective and braking position inside housing 20. Depending on the design and/or other structures that may be included in cartridge 10, band 50 may also provide handling structure and support for functional elements of cartridge 10 including, but not limited to, a write-protect switch, a door, a leader block parking space and other functional elements.

The use of the invention, as described in these illustrative embodiments, includes the steps and structures necessary for understanding and explaining the invention and it's use. Other typical steps arid structures that are normally related to the use of the invention and well known to one skilled in the art, but that are not essential to the understanding of the present invention, are not described in detail herein, to avoid confusion.

In this example, band 50 originates in an inactive, or protective and braking position in cartridge 10. In the inactive or protective and braking position, band 50 has a first effective radius R1 that is effectively the same as the radius of reel 30. The inside surface 56 of band 50 would be in contact with both circumferential edge 32E of top flange 32 and circumferential edge 34E of bottom flange 34. As previously described, when band 50 is in the inactive position with effective radius R1, band 50 functions to protect recording tape 40 and also functions as a braking mechanism, permitting reel 30 to be immobilized in a stationary position.

In the released or open position, band 50 has a second effective radius R2 that is greater than the radius of reel 30, thereby allowing reel 30 to rotate freely to the extent necessary for the use of tape 40 and cartridge 10. The operation of cartridge 10, in use, is described in more detail elsewhere in this description.

Figure 1:
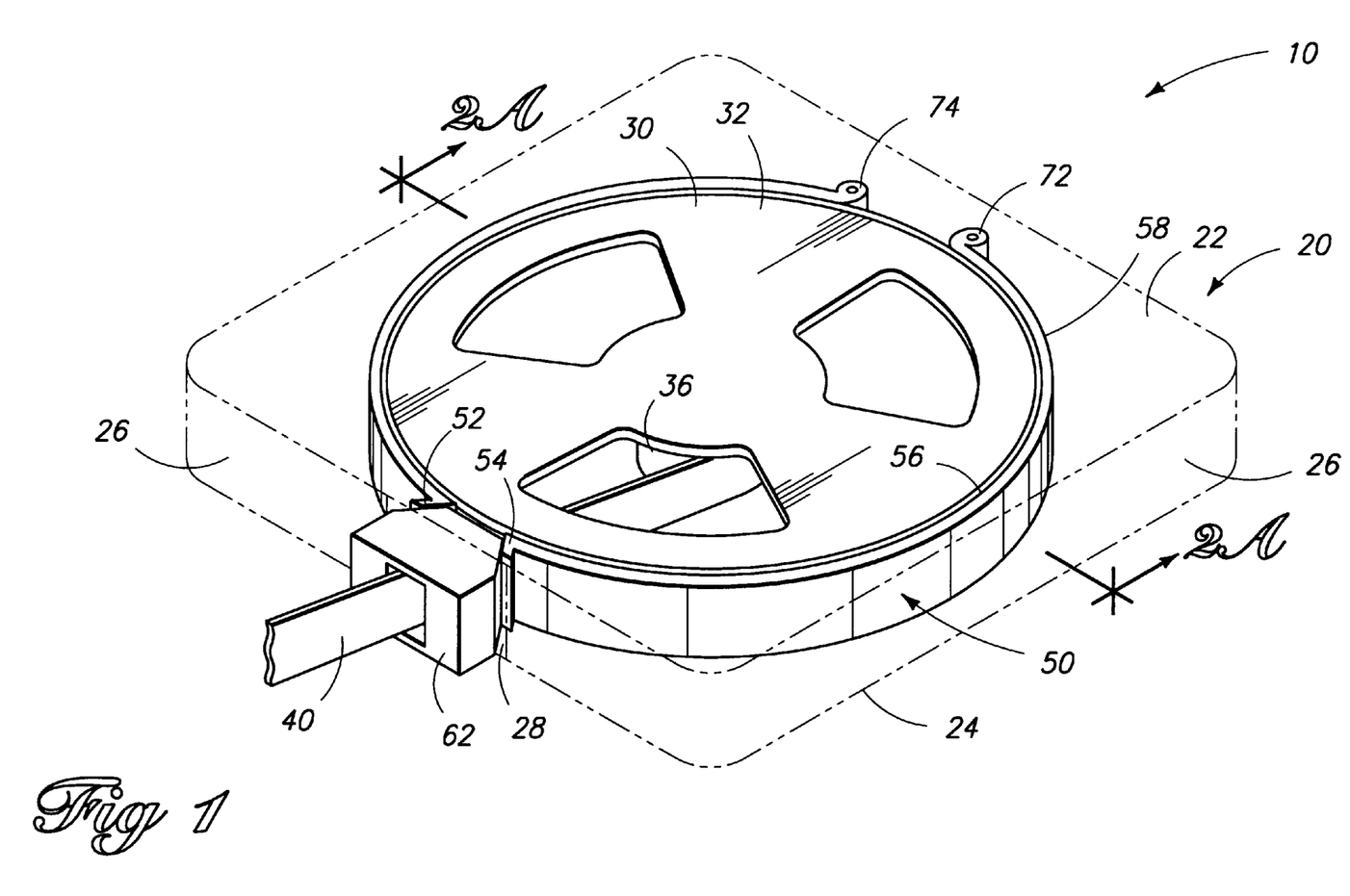
FIG. 1 is an isometric view showing an embodiment of the invention and a typical tape cartridge suitable for use with the invention.

Band 50 has at least one fulcrum point and preferably two. In one exemplary embodiment band 50 may be made from a comparatively deformable material and attached to housing 20 at two fulcrum points. Here the fulcrum points result from the attachment of band 50 to housing 20 by first rib 68 and second rib 70, as shown in FIGS. 3A and 3B. In another exemplary embodiment, band 50 is made from a comparatively rigid material and attached to housing 20 at the fulcrum points. In this embodiment the fulcrum points result from the attachment of band 50 to housing 20 by first anchor point 72 and second anchor point 74, as shown in FIGS. 1, 4A and 4B. In any embodiment housing 20 is made from a suitably rigid material, such that the outside of housing 20 is not deformed and does not change shape in response to the change of effective radius of band 50.

Band 50 would function and operate, in use, in the same manner in any embodiment. For example, starting in the inactive, or protecting and braking position, shown in FIG. 3A, the description of band 50, in use is as follows. First end 52 and second end 54 of band 50 are moved apart by radius controller mechanism 62. Radius controller mechanism 62 moves apart first end 52 and second end 54, changing the effective radius of band 50 from R1 to R2. Radius controller mechanism 62 may be a separate device that performs this operation or it may be integral with the leader block in housing 20 or may be resident in the tape drive unit that tape cartridge 10 is inserted into. In other embodiments, the radius controller device could be any appropriate device, such as, but not limited to, a cam, gear, lever, series of mechanical linkages, other appropriate mechanical devices or magnetic or electromagnetic device to move first end 52 and second end 54 apart. After first end 52 and second end 54 have been spaced apart by radius controller mechanism 62, then cartridge 10 functions in the typical fashion, as described elsewhere in this description.

From the open position, in which band 50 has the effective radius R2, band 50 may be returned to the inactive or protective and braking position, with the effective radius R1. Band 50 is returned to the inactive position by removing radius controller mechanism 62 from between first end 52 and second end 54. With the removal of radius controller mechanism 62 band 50 returns to the inactive position and has effective radius R1, which is approximately the same as the effective radius of reel 30. When band 50 is in the inactive position inside surface 56 of band 50 is in braking and protective contact with the marginal edges 32E and 34E of top rim 32 and bottom flange 34, respectively.

Band 50 has an effective radius of R1 when it is in the inactive or protective and braking position and the R1 radius is effectively the same as the radius of reel 30. In the open or released position, band 50 has second effective radius R2 that is greater than the radius of reel 30 and which allows reel 30 to rotate appropriate for use of tape 40 and cartridge 10. In any embodiment band 50 stays concentric to reel 30 in both the open position, having the effective radius R2 and the inactive position, having the effective radius R1, of band 50. Additionally when band 50 is in the open position, with effective radius R2, the outside of housing 20 does not significantly deform or change shape.

The typical function of tape cartridge 10 is well known to one skilled in the art and only briefly described herein. In use, typically tape cartridge 10 is inserted into a tape drive and a leader block retriever would captively engage with the leader block. After the engagement, the leader block would then be pulled from housing 20, through access window 28, along with attached data tape 40, through an appropriate path to thread data tape 40 in the tape drive unit for read/write operations. During read/write operations, tape 40 winds on to a take-up reel in the tape drive unit, as is well known in the art. As the take-up reel continues rotating in the same winding-on direction, data tape 40 is then wound smoothly on the take-up reel. As more and more wraps of data tape 40 continue to wrap on top of each other, the storage space on the take-up reel will become filled with tape 40.

In the reverse operation, where tape 40 is unwound from the take-up reel, and wound back onto supply reel 20 in cartridge 10, essentially the same sequence of events happens, but in reverse order. That is to say, data tape 40 simultaneously unwinds from the take-up reel and winds onto supply reel 20, traveling the opposite direction through the tape threading path. When all of the data tape is wound onto supply reel 20 the tape retriever is disengaged from the leader block, and then the leader block and band 50 will be again located in housing 20 in the initial position from whence this description started. Cartridge 10 is then ready for removal from the tape drive or transport (not shown).

It is to be understood that, in any embodiment, band 50 would still function to protect and hold reel 30 in a stationary position. Likewise it should also be understood that, in any embodiment, it is contemplated that either band inside surface 56, flanges 32 or 34 of reel 30, or any combination of those structures could be manufactured from materials which further augment the braking and protective relationship of band 50 and reel 30, when they are in contact with each other. One such example would be to use materials for the above mentioned structures with a coefficient of friction that improves the braking and protective relationship, as described above and shown in FIG. 2C.

It is most desirable that reel 30 is secured by band 50 in a stationary position in housing 20 with tape 40 under mild tension.

The present invention permits alternative way of protecting tape 40 and its associated data read/write functions in cartridge 10.

It is contemplated that this invention can be used with a wide variety of threading and/or tape supply mechanisms. For example the invention can be used with a variety of threading arm and threading pin combinations in conjunction with take-up reel 30 and housing of the tape drive unit. Likewise it is contemplated that one skilled in the art would recognize that band 50 may be appropriately manipulated to vary the effective radius of band 50 within housing 20.

Whereas particular embodiments of the invention have been described hereinabove, for purposes of illustration, it will be evident to those skilled in the art that numerous variations of the details may be made without departing from the invention as defined in the appended claims.

The apparatus and process of the present invention are not limited to the descriptions of specific embodiments presented hereinabove, but rather the apparatus and process of the present invention should be viewed in terms of the claims that follow and equivalents thereof. Further, while the invention has been described in conjunction with several such specific embodiments, it is to be understood that many alternatives, modification, and variations will be apparent to those skilled in the art in light of the foregoing detailed descriptions. Accordingly, this invention is intended to embrace all such alternatives, modifications, and variations which fall within the spirit and scope of the appended claims.

It will therefore be understood that modifications and variations are possible without departing from the scope of the invention as expressed in the following claims.

What is claimed is:

1. A tape cartridge, comprising:

a housing having an opening therein;

a tape-supply reel rotatably disposed within the housing, the reel having opposing first and second flanges each extending radially out from a hub to a circumferential edge;

a web of magnetic tape wound on said tape reel and hating a free end disposed proximate said housing opening; and a band substantially surrounding at least one of the edges of the tape reel flanges, the band being anchored with respect to the reel to at least one fulcrum point for the band to allow variation of an effective radius of the band between a first braking radius in which the band contacts the at least one of the edges of the flanges to prevent the reel from rotating and a second larger release radius in which the reel is free to rotate, and the band configured to interact with a radius controller mechanism for varying the effective radius of the band.

2. The tape cartridge of claim 1 wherein the tape-supply reel is configured for releasably locking with the band.

3. The tape cartridge of claim 1 wherein the band is composed of a deformable material.

4. The tape cartridge of claim 1 wherein the band is composed of a rigid material.

5. The tape cartridge of claim 1 wherein the at least one of the edges of the tape reel flanges has a high coefficient of friction.

6. The tape cartridge of claim 1 wherein the band is manufactured from a material with a high coefficient of friction.

7. The tape cartridge of claim 1 wherein the band and the at least one of the edges of the tape reel flanges are manufactured from a material with a high coefficient of friction.

8. The tape cartridge of claim 1, wherein the band surrounds and extends between the edges of both reel flanges.

9. A tape cartridge for use with an operatively compatible tape drive having a tape reeling mechanism, comprising:

a housing having an inside, and outside and an opening therein;

a tape-supply reel rotatably disposed within the housing, the tape-supply reel having a top flange and a bottom flange extending radially out from a central hub to a circumferential edge;

a web of magnetic tape wound on said tape reel and having a free end disposed proximate said housing opening; and a leader block; and a band substantially surrounding at least one of the edges of the tape reel flanges, the band being anchored to stay concentric to the reel to allow variation of an effective radius of the band between a first braking radius in which the band contacts the at least one of the edges of the flanges to prevent the reel from rotating and a second larger release radius in which the reel is free to rotate, and wherein the outside of the housing does not change shape from the variation of the effective radius of the band.

10. The tape cartridge of claim 9 wherein the at least one of the edges of the tape-supply reel flanges is configured for releasably locking with the band.

11. The tape cartridge of claim 9 wherein the band is composed of a deformable material.

12. The tape cartridge of claim 9 wherein the band is composed of a rigid material.

13. The tape cartridge of claim 9 wherein the at least one of the edges of the supply reel flanges has a high coefficient of friction.

14. The tape cartridge of claim 9 wherein the band is manufactured from a material with a high coefficient of friction.

15. The tape cartridge of claim 9 wherein the band and the at least one of the edges of the tape reel flanges are manufactured from a material with a high coefficient of friction.

16. The tape cartridge of claim 9, wherein the band surrounds and extends between the edges of both reel flanges.

17. A tape reel braking mechanism which comprises:

a band substantially surrounding circumferential edges of the tape reel flanges;

the band being anchored with respect to the reel to at least one fulcrum point for the band to allow variation of an effective radius of the band between a first braking radius in which the band contacts the at least one of the edges of the flanges to prevent the reel from rotating and a second larger release radius in which the reel is free to rotate; and a radius controller for varying the effective radius of the band.

18. The tape reel braking mechanism of claim 17, wherein the band surrounds and extends between the edges of both reel flanges.

* * * * *